Figure 1:
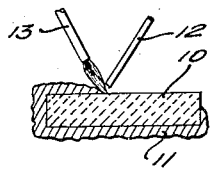

Sept. 12, 1933.  A. V. HARRIS ET AL  1,926,770
PRODUCTION OF CASTINGS HAVING WEAR RESISTANT INSERTS Filed Feb. 17, 1931

INVENTORS:
Albert V. Harris,
William A. Wissler,
BY Byrnes, Townsend & Potter,
ATTORNEYS.

Patented Sept. 12, 1933

1,926,770

UNITED STATES PATENT OFFICE 1,926,770

PRODUCTION OF CASTINGS HAVING WEAR-RESISTANT INSERTS

Albert V. Harris, Bloomfield, N. J., and William A. Wissler, Jackson Heights, N. Y., assignors to Haynes Stellite Company, a corporation of Indiana Application February 17, 1931. Serial No. 516,498

7 Claims. (Cl. 22—202)

The invention relates to the production of strong wear-resistant surfaces and edges for cast metal machine parts and tools, such as bucket teeth for earth excavators.

Wear-resistant tools and machine parts having great strength and shock-resistance are required. In order to obtain these properties it is desirable to make the tools or parts of a composite material by casting in a mold a comparatively inexpensive, strong, shock-resistant metal around inserts or slugs composed of harder, higher melting point, and more wear-resistant material, such as tungsten carbide, which slugs are carried in the cutting edge or face of the tool in predetermined spaced positions. It is necessary to form a strong bond between the inserts and the cast metal.

It has been found that the hard, strong, wear-resistant substances, such as tungsten carbide, which may be used for inserts, shatter and fracture when they are subjected to sudden and great changes in temperature, such as the changes produced by casting high melting point alloys, iron or steel into a mold in which the inserts are lodged. This causes the inserts to fall away from their proper positions in the molds. Either because of the slow rate with which the inserts bond with the cast metal at the temperature which can be used for making castings, or because of the formation of oxides on the inserts during casting, the junction between the inserts and the cast metal is weak.

In order to give the greatest strength and wearing qualities to the structure, it is desirable to embed the inserts in the cast metal so that the surfaces of the inserts are flush with the surfaces of the finished tool face. If the inserts are held in place by partially embedding them in the wall of the mold, the projecting portions of the inserts must be broken off. This tends to loosen the inserts and the severed portions of the costly insert material becomes practically useless scrap.

These defects have been overcome by coating each insert in a preliminary operation with a layer of fusible metal which will readily bond itself to the cast metal. Suitable metals for this purpose are iron, alloy or carbon steel, the metal of which the casting is composed, or the high melting point non-ferrous alloy composed mainly of chromium, cobalt, and tungsten described in U. S. Patent 1,057,423 issued to Elwood Haynes, but other high melting point alloys can be used. The best results are obtained by slowly heating the insert to avoid shattering the insert and building one or more layers of fused metal onto the insert so that a coating of considerable thickness and heat capacity, say about one thirty-second of an inch or more in thickness is formed. If the material of the inserts is difficult to alloy with the coating material, the coating may desirably be heated until a firm bond of the surface layers of the insert with the inner layers of the coating is produced.

Figure 2:
Figure 3:
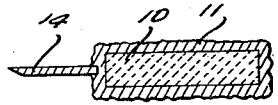

The accompanying drawing, Figures 1 to 4, are illustrative of one embodiment of the invention. Referring to Figure 1, a granule of tungsten carbide 10 is coated by the use of a welding rod 12 and a welding torch 13, such as an oxy-acetylene torch. The rod may be composed of the metal which is to be cast or of other high melting point metal or alloy, such as iron, carbon steel, alloy steel, or the high melting point non-ferrous alloy. The insert 10 is slowly heated so that the fused metal 11 of the welding rod will readily wet its surface. The end of the welding rod is heated to fusion and the fused metal is allowed to flow onto the granule. The heating may be discontinued with easily bonded metals as soon as the coating metal has spread out over the surface of the granule but with metals which are difficult to bond with tungsten carbide, further heating may be used. A complete insert except for anchor member is shown in Figure 2. Thicker coatings with greater heat capacities may be made by permitting the first coating to harden and then welding on additional layers of the metal of the rod. Finally, as shown in Figure 3 a metal anchor or pin 14 shaped so that it can be lodged in the mold wall and hold the insert in place, is attached to the coating by welding.

Figure 4:
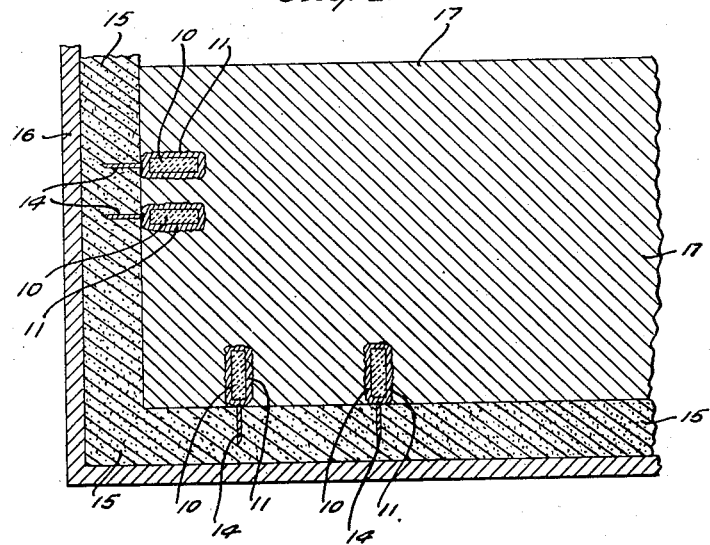

In making the casting, the mold is prepared and the inserts are attached as shown in Figure 4 to the face 15 of the mold 16 by embedding only the pin or anchor 14 in the mold wall 15 so that the end of the insert nearest the pin will be approximately flush with the mold wall. Molten body metal, such as steel, is poured into the mold surrounding the coated inserts. A gradual heating of the inserts takes place by reason of the heat capacity of the coatings. The heat of the cast metal 17 gradually softens the submerged coating forming a strong bond with the insert without exposing the insert to oxidizing gases. Thus, pre-coating provides means to regulate the rate of heating the inserts when the casting is made and it avoids disintegration of the inserts. It provides a pre-bonded coating of fusible metal which readily unites with the cast metal. The pins are cut off flush with the surface of the cooled and hardened casting without removing any of the insert. This may be done by means of an oxy-acetylene cutting torch or other convenient means.

The term "tungsten carbide" as used in this specification and claims, includes the crystalline or sintered, refractory, abrasion resistant materials having hardness exceeding 8 on the Mohs scale which are composed largely of tungsten and/or molybdenum with about 2% to 7% carbon and may contain varying amounts of other metals, such as cobalt, nickel or iron. It is to be understood that the use of inserts composed of other substances which are difficult to alloy with the metal to be cast may be utilized in accordance with our invention.

We claim:—

1. In the method of making a cast ferrous metal article with inserts composed of a difficultly fusible substance in its wearing faces the steps which comprise gradually heating the inserts, depositing on each insert by welding methods a coating of fused metal which will readily unite with the body metal of the article when it is cast, which coating has sufficient heat capacity to prevent the shattering of the insert when it is submerged in melted ferrous metal, and securing the inserts to the mold face.

2. In the method of making a cast ferrous metal article with inserts composed of a difficultly fusible substance in its wearing faces the steps which comprise gradually heating the inserts, depositing on each insert by welding methods a coating of fused metal which will readily unite with the body metal of the article when it is cast, which coating has sufficient heat capacity to prevent the shattering of the insert when it is submerged in melted ferrous metal, attaching an anchor member to the coating, and securing the inserts in the mold by embedding only the anchor member in the mold face.

3. In the method of making a cast ferrous metal article with tungsten carbide inserts in its wearing faces the steps which comprise gradually heating the inserts to avoid shattering thereof, depositing on each insert by welding methods a coating of fused metal which will readily unite with the body metal of the article when it is cast, which coating has sufficient heat capacity to prevent the shattering of the insert when it is submerged in melted ferrous metal, and securing the inserts to the mold face.

4. The method of making a cast metal article having a cast ferrous metal body with tungsten carbide inserts in its wearing faces which comprises pre-coating the inserts by welding on a coating of an alloy of cobalt, chromium and tungsten, which coating has sufficient heat capacity to prevent the shattering of the insert when it is submerged in melted ferrous metal, securing the insert in a mold, and pouring the ferrous metal into the mold.

5. The method of making an article having a cast ferrous metal body with tungsten carbide inserts in its wearing faces which comprises pretreating the inserts by gradually heating them and precoating each insert by welding on a coating of an alloy of cobalt, chromium and tungsten which coating has sufficient heat capacity to prevent the shattering of the insert when it is submerged in melted ferrous metal, attaching an anchor member to the coating, securing the inserts in the mold by embedding only the anchor member in the mold face, and pouring the ferrous metal into the mold.

6. An insert comprising a body of tungsten carbide and a coating composed of an alloy of cobalt, chromium and tungsten which coating has sufficient heat capacity to prevent shattering of the insert when it is submerged in melted ferrous metal.

7. An insert comprising a body of hard, strong, wear-resistant and difficultly fusible material which tends to shatter when submerged in melted ferrous metal, a coating composed of an alloy of cobalt, chromium and tungsten which coating has sufficient heat capacity to prevent the shattering of the insert when it is submerged in melted ferrous metal, and an anchor member attached to said coating and adapted to engage a mold and hold the insert in place while molten metal is poured into the mold to surround the insert.

ALBERT V. HARRIS.
WILLIAM A. WISSLER.